July 22, 1969

M. W. ELWELL ETAL 3,456,747

HOLE-CUTTING TOOL

Filed April 10, 1967

INVENTORS
MAURICE W. ELWELL
HAROLD L. ANDREWS
STEVEN C. ELWELL

BY Lindenberg & Freilich

ATTORNEYS

United States Patent Office 3,456,747
Patented July 22, 1969

3,456,747
HOLE-CUTTING TOOL
Maurice W. Elwell, 5335 Wiseburn, Hawthorne, Calif. 90250, Steven C. Elwell, 2176 S. Beverly Glen Blvd., Los Angeles, Calif. 90025, and Harold L. Andrews, 5336 Wiseburn, Hawthorne, Calif. 90250
Filed Apr. 10, 1967, Ser. No. 629,646
Int. Cl. E21b *9/16;* E21c *13/01*
U.S. Cl. 175—403                                          5 Claims

ABSTRACT OF THE DISCLOSURE

A tool for attachment to an electric drill or the like for cutting large diameter holes, having a cup-shaped support of the diameter of the hole to be drilled with slots in its periphery for holding cutting tools, the support having high cup sides to enable the holding of cutting bits of the type typically used on lathes.

BACKGROUND OF THE INVENTION

This invention relates to cutting tools and more particularly to tools for cutting large diameter holes.

Many applications require that a large diameter hole be drilled with simple power equipment such as hand-held power drills. One common application is the installing of ducting in buildings, as is required for gas clothes dryers, wherein holes of approximately four inches in diameter must be formed through concrete and plaster walls. Typically, holes of this type are formed by chipping away at the wall using a hammer and chisel, for example. As can be appreciated, however, such a procedure is slow and inaccurate.

SUMMARY OF THE INVENTION

One object of the present invention is to provide a tool suitable for cutting large diameter holes through concrete block, stucco, and plaster, for example.

Another object of the invention is to provide a cutting tool for large diameter holes adapted to be used with hand-held power driving means.

The foregoing and other objects of the invention are realized by a hole cutting tool which includes a cup-shaped support having slots formed in the cup walls for holding cutting bits. Cutting or tool bits of the type used in simple lathes, which comprise a rectangular cross-section shank with a cutting tip at one end, are located in the slot with their cutting tips protruding past the top of the cup rim. The cup-shaped support is mounted on an arbor for attachment to the chuck of an ordinary hand-held power drill. A pilot drill is preferably located at the center of the cup support for piloting the device.

In order to cut a hole, the tool is held so that the pilot drill is against the wall in which the hole is to be cut with the rim of the cup facing the wall. As the hand-held power drill rotates the cut, the pilot drill cuts into the wall allowing the cutting tips of the tool bits to cut a ring-shaped path in the wall; when the tips reach the outer side of the wall, a core of wall can be removed and a large hole has been formed. The sides of the cup-shaped support are straight so that they pass into the ring-shaped channel cut by the cutting tips. The tips of the cutting bits are wider than the thickness of the cup walls so that the cup walls easily pass into the ring-shaped channel.

DESCRIPTION OF THE PREFERRED EMBODIMENT

Figure 1:
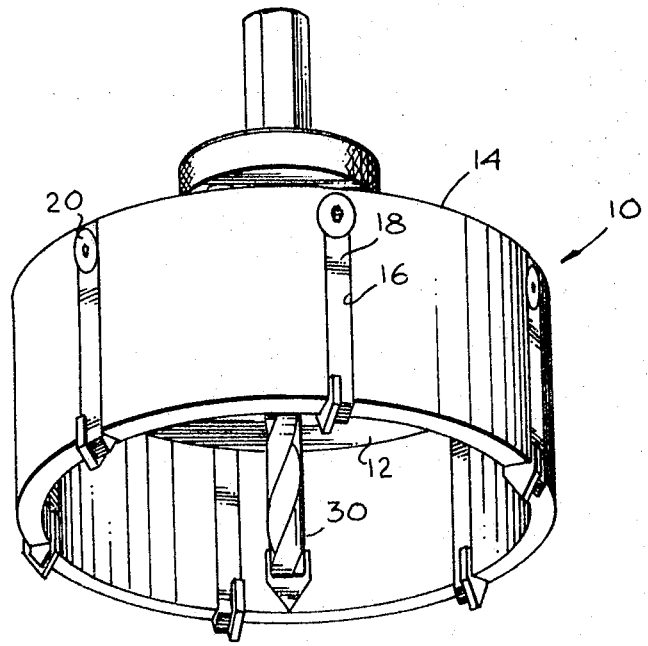
FIGURE 1 is a perspective view of an embodiment of the invention.
Figure 2:
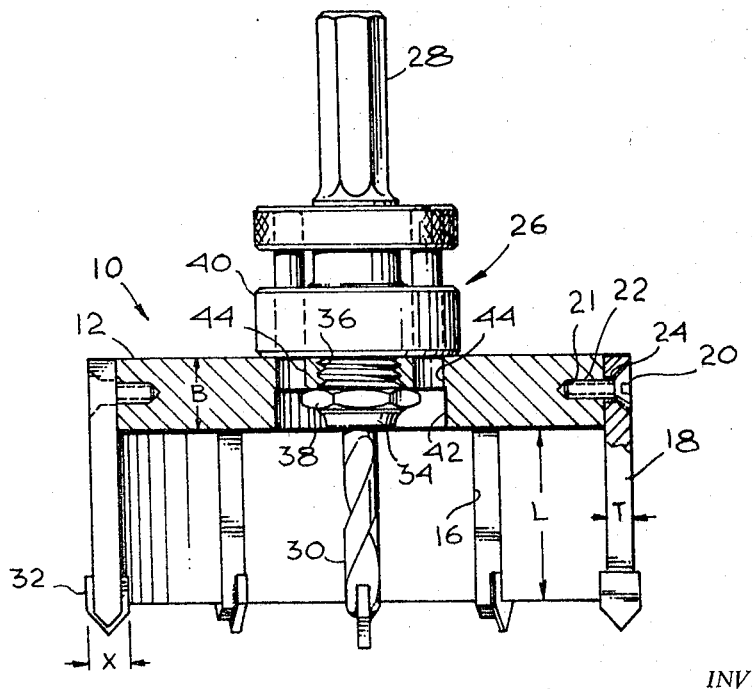
FIGURE 2 is a side elevation sectional view of the embodiment shown in FIGURE 1.

The embodiment of the invention shown in FIGURES 1 and 2 comprises a cup-shaped support 10 having a base 12 and integral side walls 14 with straight sides of constant diameter throughout their depth. Six longitudinal slots 16 formed in the walls hold cutting bits 18. The bits 18 are held in the slots 16 by screws 20. The screws 20 project through countersunk holes 24 formed in the bits 18 and into threaded holes 21 in the base. Threaded steel inserts 22 in the holes 21 serve to tightly engage the screws with the base.

An arbor 26 is attached to the base 12 of the cup-shaped support. The arbor serves to provide a connection between the support and an electric drill or other means for rotatably driving the device, a shank 28 of the arbor being adapted to be held by the chuck of an electric drill. A drill bit 30 held by the arbor and positioned at the center of the cup-shaped support 10, serves as a pilot to keep the hole cutting tool centered about the axis of the hole it is cutting.

The cutting bits 18 have shanks with a thickness T approximately equal to the thickness of walls 14 of the support. Each bit has a cutting tip 32 which projects past the rim of the support walls 14 and which performs the actual cutting operation. The tips 32 are generally of a hard material such as tungsten carbide and may be attached to their shanks by brazing or welding, or may be made integral with the shank. The tips have a width X which is greater than the thickness T of either the shank of the cutting bits or the thickness of the walls 14. As a result, the channels cut by the rotating tips readily accommodate the shanks and walls that follow behind the tips as they enter the work piece in which the hole is cut. The cutting tips 32 and the ends of the shanks on which they are attached have clearance by reason of being tapered so that the front of the tip, which is the leading portion of the bit as it cuts into a work piece, cuts a wide enough channel to accommodate the following portions of the tool. The wall portions on either side of the slots 16 receive the force of the work piece against the cutting tips.

The arbor 26 is attached to the cup-shaped support 10 by a nipple 34 which screws into a threaded hole 36 at the center of the cup-shaped support. The nipple is held firmly in place by a jam nut 38 which tightens a collar 40 of the arbor against the base 12 of the support. A groove or recessed portion 42 is formed in the center of the base 12 to accommodate the jam nut, so that the nipple 34 need not protrude and limit the depth of work piece in which a hole can be cut by the tool. Torque holes 44 are formed in the base portion in case it is desired to insert pins therein to fasten the arbor more firmly to the support. Insertion of pins therein enables the application of more torque without damaging the tool and assures that the arbor and support remain together even if the arbor is turned backward.

The drill bit 30 used for piloting the hole cutter may be any of the usual types, a carbide-tipped twist drill bit being shown in the figure. The drill bit is received in a hole in the nipple and is held in place by a set screw (not shown) which projects radially through the collar 40 of the arbor.

In the use of the tool, the cup-shaped support with the arbor 26 and drill bit 30 attached as shown, is attached to an electric drill or the like by insertion of the shank 28 of the arbor in the chuck of the electric drill. The electric drill is set for a very low speed such as only several revolutions per second.

The tool is held against the work piece in which the large hole is to be formed. The drill bit 30 is started in the work piece and pressure is applied on the arbor. Soon after the drill bit 30 enters the work piece, the tips 32 of the cutting bits begin to cut a groove therein. As the operation proceeds, the groove cut by the tips 32 grows deeper and the wall 14 of the cup-shaped support enters the groove. The groove is thicker than the walls 14 so the walls 14 are easily accommodated therein. Finally, the groove in the work piece will reach to the other side of the work and a core having a diameter approximately equal to the inner diameter of the walls 14 will have been separated from the work piece and a large hole will result.

The maximum thickness of work piece that can be drilled in this manner is equal to the length L of the walls 14 of the support. A hole can be formed in a work piece of twice this length L by performing the operations twice, once on each side of the work piece, with the small central hole serving to center the grooves formed on opposite sides of the work piece. For best results on concrete block and hard masonry, small amounts of water should be sprayed on the work to facilitate the cutting.

After substantial use of the tool, the cutting tips 32 may become dull. In order to sharpen them, the cutting bits 18 are removed by unloosening the screws 20 which hold them in place. The removed cutting bits can be resharpened on any silicon carbide grinding wheel in essentially the same manner as cutting bits used on simple lathes. Generally, all that is required is that the grinding wheel platform be tiltable. After sharpening, the cutting bits are replaced in the slots and the screws 20 are reinserted and tightened. The cutting bits will automatically align themselves with the walls of the slots 16 because the thickness B of the base is more than twice as great as the width of the slots which is approximately equal to the thickness T of the cutting bits. The slot length along the distance B is generally sufficient to maintain such alignment.

The above-described tool provides a sturdy apparatus by reason of the relatively thick base 12 and walls 14 of the cup-shaped support, which also provide firm support for the cutting bits 18 and their cutting tips 32. The maintenance of the device in good cutting condition is easily performed because the cutting bits are very easily removed and can be sharpened by the average mechanic using a silicon carbide grinding wheel and the ordinary skills used in sharpening simple cutting bits.

While a particular embodiment of the invention has been illustrated and described herein, it should be understood that many modifications and variations may be resorted to by those skilled in the art, and the scope of the invention is limited only by a just interpretation of the following claims.

What is claimed is:
1. A large hole-cutting tool comprising:
   a support having a substantially planar base and annular walls extending axially therefrom;
   a plurality of slots formed axially in said walls;
   a plurality of cutting bits disposed in said slots;
   walls defining threaded holes formed radially in said base;
   walls defining holes formed in said cutting bits;
   threaded fasteners projecting through said holes in said bits and said base for fastening them together; and
   cutting tips disposed on said bits and projecting axially beyond the end of said annular walls, said tips having widths greater than the width of said walls.

2. A hole-cutting tool as defined in claim 1 wherein: said slots in said walls extend to an area along the thickness of said base and the length of the slot portions along said thickness of said base is at least twice as great as the width of said slots, whereby to enable the holding of said cutting bits in alignment with the walls of said slots throughout the entire lengths of said slots by a single screw passing through said bits into said base.

3. A large hole-cutting tool as defined in claim 1 including:
   walls defining a hole formed in said base at its center for receiving an arbor therethrough; and
   walls defining a recessed groove about said hole in said base on the side of said base facing said annular walls for receiving a nut which fastens said arbor to said base.

4. A large hole-cutting tool comprising:
   a cup-shaped support having longitudinal slots in its side walls and threaded holes in its base;
   elongated cutting bits disposed in said slots, said cutting bits having shanks of rectangular cross-section with at least one thickness approximately equal to the thickness of said side walls and having cutting tips projecting axially past the rim of said walls of said support, said bits having cutting tips with a width greater than the thickness of said side walls, and said shanks having holes;
   threaded fasteners projecting through said holes in said shanks and into said holes in said base; and
   means for rotating said cup-shaped support around its axis.

5. A large hole-cutting tool comprising:
   a cup-shaped support having longitudinal slots in its side walls, and including a base portion having a central hole for receiving an arbor and a recessed portion formed about said hole on the side of said base facing said side walls;
   elongated cutting bits disposed in said slots and having cutting tips projecting axially past the rim of said walls of said support, said bits having cutting tips with a width greater than the thickness of said side walls; and
   means for rotating said cup-shaped support around its axis, including threaded nipple means projecting through said central hole in said base and a nut threaded on said nipple and disposed within said recessed portion, whereby to enable said tool to cut to a maximum depth.

References Cited
UNITED STATES PATENTS

| | | | |
|---|---|---|---|
| 269,768 | 12/1882 | Wintz | 175—413 X |
| 274,531 | 3/1883 | Switzer | 175—413 |
| 2,638,021 | 5/1953 | Vander Heiden | 175—403 X |
| 2,693,938 | 11/1954 | Roberts | 175—413 X |
| 2,599,770 | 6/1952 | Marcerou | 175—403 X |
| 2,803,435 | 8/1957 | Kammerer | 175—413 |
| 2,857,140 | 10/1958 | Johnson | 175—413 X |

CHARLES E. O'CONNELL, Primary Examiner
RICHARD E. FAVREAU, Assistant Examiner

U.S. Cl. X.R.
175—410